Sept. 11, 1934.  R. D. STEVENSON  1,973,671
CLUTCH MECHANISM
Filed March 25, 1932   2 Sheets-Sheet 1
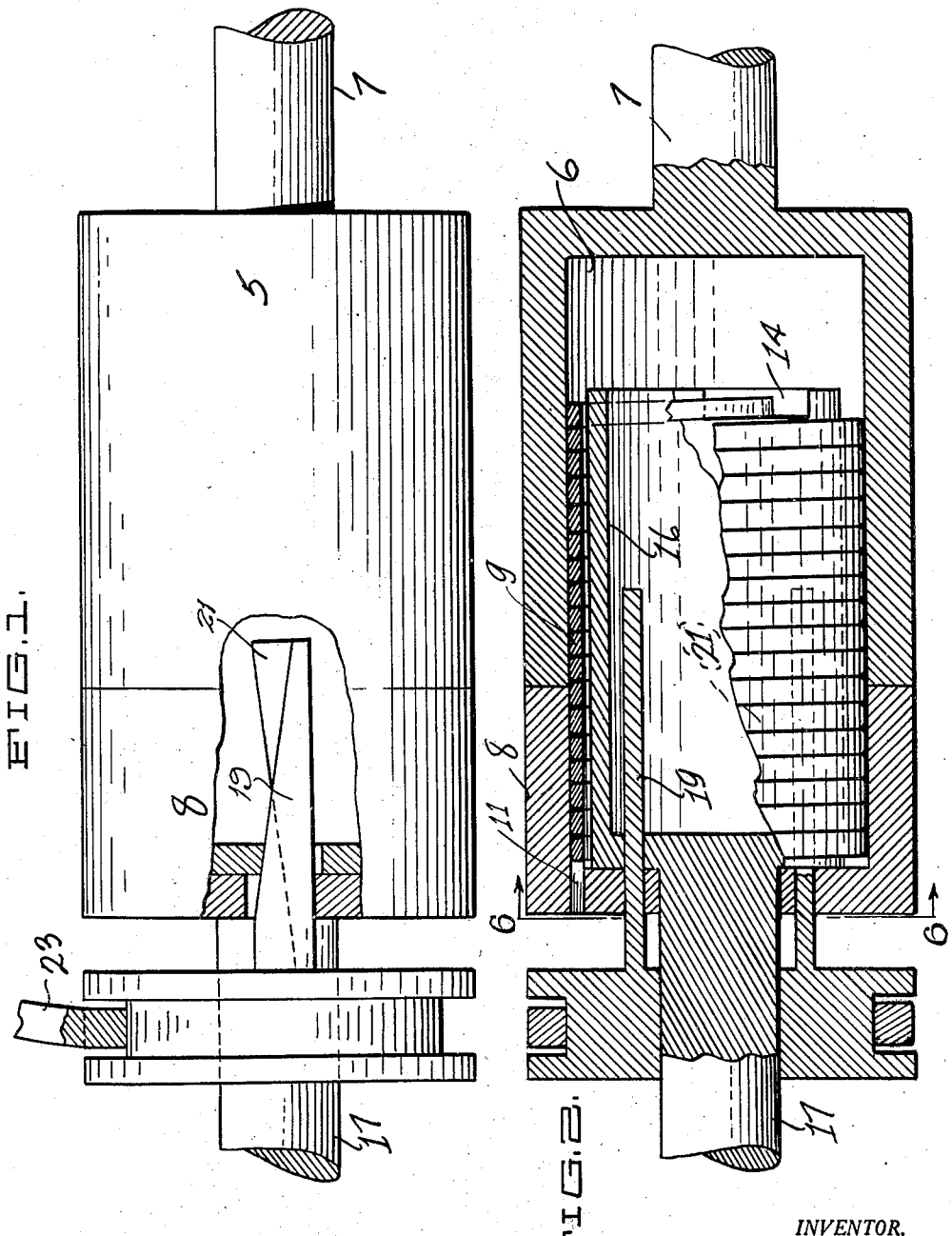
INVENTOR.
R. D. STEVENSON.
BY *Victor J. Evans & Co*
ATTORNEYS.

Sept. 11, 1934.　　R. D. STEVENSON　　1,973,671
CLUTCH MECHANISM
Filed March 25, 1932　　2 Sheets-Sheet 2
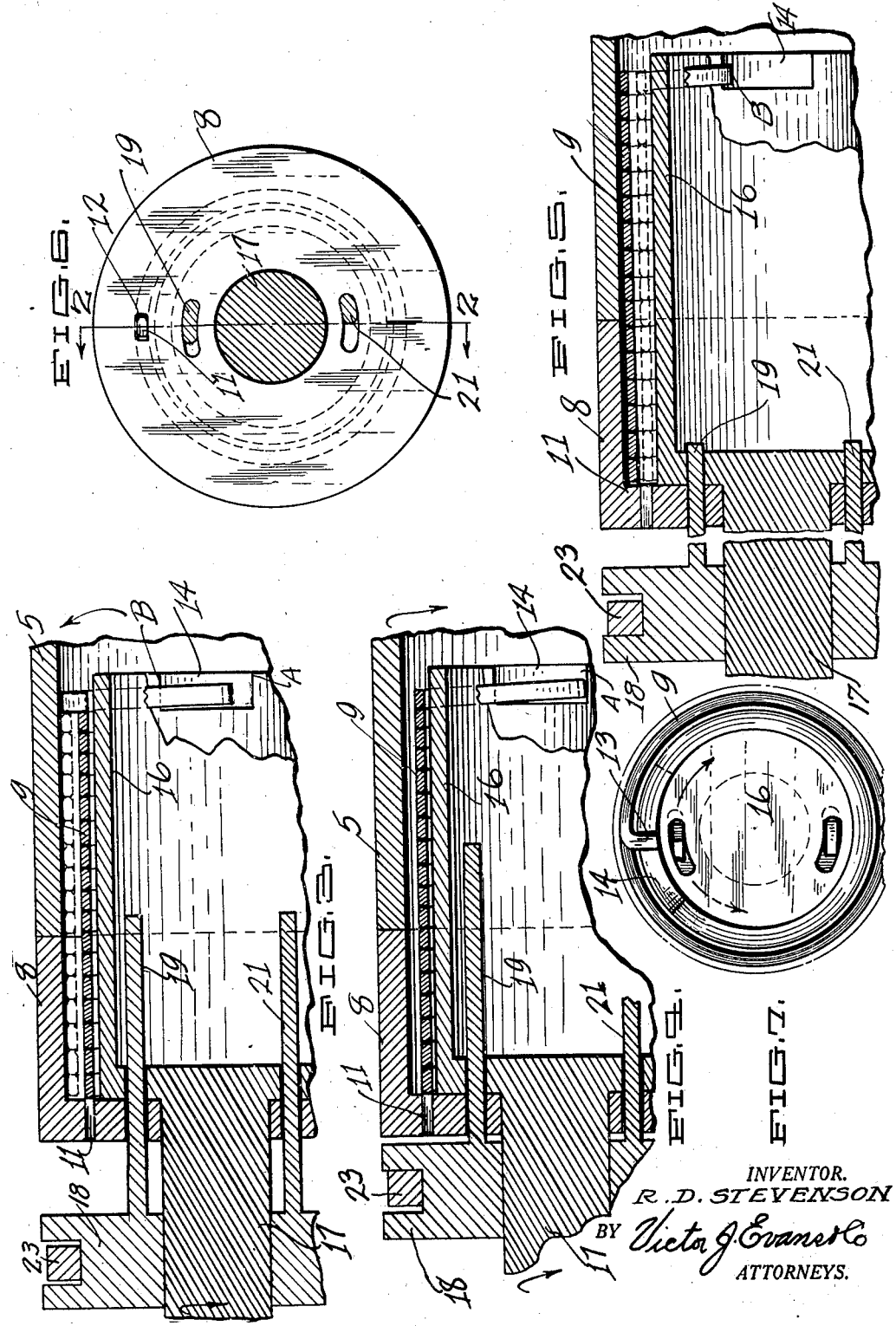
INVENTOR.
R. D. STEVENSON
BY Victor J. Evans & Co
ATTORNEYS.

Patented Sept. 11, 1934

1,973,671

UNITED STATES PATENT OFFICE 1,973,671

CLUTCH MECHANISM

Reginald D. Stevenson, San Francisco, Calif.

Application March 25, 1932, Serial No. 601,247

3 Claims. (Cl. 192—74)

This invention relates to improvements in clutch mechanism and has particular reference to a clutch mechanism which will permit clutching or disconnection between a driving and a driven element.

The principal object of the invention is to provide means whereby the clutching action incident to what is known as free wheeling may be thrown into or out of operation at the will of the driver and without any appreciable jerking action.

A further object is to produce a device which may be attached to a standard form of automobile without materially altering its construction.

A further object is to provide a device which is simple in construction and therefore one which will not be easily deranged, and one which is economical to manufacture.

A still further object is to produce a device which conforms to standard engineering practice.

Other objects and advantages will be apparent during the course of the following description.

In the accompanying drawings forming a part of this specification and in which like numerals are employed to designate like parts throughout the same, Fig. 1 is a side elevation of my device, Fig. 2 is a vertical cross sectional view thereof, with parts in elevation, Fig. 3 is a fragmentary sectional view showing the parts in free wheeling position with the spring arranged in full lines when free wheeling is taking place and in dotted lines when power is applied to drive the vehicle from the engine.

Fig. 4 is a similar view showing the parts arranged when positive clutch action is taking place, with the spring held in gripping position.

Fig. 5 is a similar view showing the parts in declutched position, with the spring held out of gripping position.

Fig. 6 is an end elevation taken on the line 6—6 of Fig. 2, and

Fig. 7 is an end elevation of the spring actuator illustrating the manner in which the spring may be contracted or expanded.

It has become common practice to place upon motor vehicles, various devices for permitting the rear wheels of the vehicle to over-run the engine speed particularly in coasting down grade. This feature has been termed in the trade, "free wheeling". There are many devices for accomplishing this feature, one of which is known as a spring drive, the principle being that a spring positioned within a sleeve permits relative movement between the spring and the sleeve when the sleeve is rotated at a speed faster than the rotation of the spring which spring is connected to the drive of the engine. When the engine speed is greater than the speed of the wheels, then the spring expands and grips the sleeve. This principle is well known and needs no further comment other than to say that applicant employs this principle and by certain additions thereto has created a clutch mechanism and also means for locking the free wheeling feature against functioning when desired.

In the accompanying drawings wherein for the purpose of illustration is shown a preferred embodiment of my invention, the numeral 5 designates a driven member having a bore 6 and connected to a shaft 7. In axial alignment with this driven member 5 is a spring actuator 8 having a bore of the same diameter as the bore 6. This permits a spring member 9 to be housed within the bore of the two members, one end of the spring 11 entering a slot 12 formed in the spring actuator 8. The opposite end of the spring 9 is bent as shown at 13 (see Fig. 7), and enters a slot 14 formed in the driving member 16. This driving member is connected to the driving shaft 17. The result is that the shaft 17, the member 16, the spring actuator 8 and the spring 9 rotate in unison, there, however, being a slight movement between the driving member 16 and the actuator member 8. This is brought about by a sliding collar 18 which has tapered keys 19 and 21 secured thereto. These keys 19 and 21 pass through slots formed in the spring actuator and in the driving member and are so shaped and arranged that as the sliding collar is moved through the action of the yoke 23, the keys engage the walls of the slots of the spring actuator 8 and driving member 16, so that an axial rotation will take place between the same. The action of the keys 19 and 21 is as follows: The driving member 16 has arcuate shaped slots which are in alignment with arcuate shaped slots formed in the spring actuator. Therefore, any rotary effect between these two members would tend to cause the slots in the two parts to move out of alignment with each other. Therefore, by employing tapered keys, the amount of movement of the slots with respect to each other, may be readily controlled. It will, therefore, be apparent that the inward and outward movement of the member 18 with its attached keys will cause rotary motion between the driving member and the spring actuator.

In Figs. 2 and 4 I have shown the actual relation of the spring 9 with respect to the members 5 and 8, but in Figs. 3 and 5 in order to show the operation it has been necessary to exaggerate the positon of the spring so that its action may be understood.

Referring now to Fig. 3, it will be noted that the keys 19 and 21 are in an intermediate position or arranged substantially midway their ends through the slots, so that the spring is positioned whereby the bent end 13 thereof is disposed midway between the ends of the slot 14, so that the spring will be free to move into and out of engagement with respect to the members 5 and 8. We will assume now that the shaft 17 is rotating faster than the rear wheels and consequently the driven member 5, with the result that the friction upon the outer surface of the spring member 9 will cause the same to expand moving from the position shown in this figure in full lines tightly against the inner surface of the bore of the driven member 5 and the spring actuator 8. In other words the spring has tended to unwind and consequently has expanded itself in diameter thus effecting a very positive driving connection. Now assuming that the car upon which the device is installed is rolling down a grade and that the engine speed is less than that of the rear wheels the result will be that the member 5 will tend to rotate faster than the spring actuator 8 and consequently the member 5 will slide over the surface of the spring for the reason that the action is opposite to that just described and the spring tends to coil itself tightly and to thus decrease its coil diameter. Now assuming that this condition does exist and a person is free wheeling and desires to stop the free wheeling action, the same may be accomplished by sliding the collar 18 through the medium of the yoke 23 so that the tapered keys rotate the spring actuator 8 with relation to the driving member 16 until the edge A of the slot 14 moves against the end 13 of the spring, resulting in the spring being forcibly expanded in gripping engagement with the driven member and the spring actuator thus holding these members together for rotation in unison. This action is shown in Fig. 4 which illustrates the keys moved to their innermost positions.

In Fig. 5 I have illustrated the parts of the device as being in declutched position. This is accomplished by moving the keys to their outermost position to cause them to rotate the spring actuator so that the end of the spring abuts the end B of the slot 14 and rotates the spring in a direction to contract the coil diameter and thus draw and hold the spring away from the driven member. It will be apparent that as one end of the spring is fixed at 11 and the spring actuator is movable for disposing the opposite end 13 of the spring against the ends A and B of the slot 14, rotation of the parts 8 and 16 with relation to each other will accomplish the expanding or contracting of the spring at will and therefore, the gripping action with respect to the members 5 and 8 may be readily controlled and with a degree of nicety not possible with the ordinary clutch.

It will thus be seen that I have produced a device which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, a driven member, a spring actuator, a spring positioned in said spring actuator and having one end secured thereto, said spring extending into said driven member, a driving member having a slot formed therein and adapted to engage the free end of said spring when said actuator is rotated in either direction with relation to said driving member, and means for rotating said actuator with relation to said driving member from a remote point.

2. In a device of the character described, a driven member having an internal bore therein, a spring actuator abutting said driven member and having a bore therein, of the same diameter as said first mentioned bore, a coiled spring positioned in said bores and capable of contacting said driven member and said spring actuator, one end of said spring being secured to said spring actuator, a driving member positioned in said bores and having an external diameter less than the internal diameter of said spring, means for rotating said spring actuator with respect to said driving member, and means for connecting the free end of said spring with said driving member whereby the coiled diameter of said spring may be varied from a remote point.

3. In a device of the character described, a driven member having an internal bore therein, a spring actuator abutting said driven member and having a bore therein, of the same diameter as said first mentioned bore, a coiled spring positioned in said bores and capable of contacting said driven member and said spring actuator, one end of said spring being secured to said spring actuator, a driving member positioned in said bores and having an external diameter less than the internal diameter of said spring, means for rotating said spring actuator with respect to said driving member, said means including cam-shaped keys movable longitudinally through said driving member and said spring actuator, whereby the coiled diameter of said spring may be varied from a remote point through the actuation of said cam-shaped keys.

REGINALD D. STEVENSON.